United States Patent [19]

Redden et al.

[11] Patent Number: 5,602,901

[45] Date of Patent: Feb. 11, 1997

[54] SPECIALIZED CALL ROUTING METHOD AND APPARATUS FOR A CELLULAR COMMUNICATION SYSTEM

[75] Inventors: James P. Redden, Mesa; Michael W. Krutz, Chandler; Richard L. Astrom, Phoenix, all of Ariz.

[73] Assignee: Motorola, Inc., Schaumburg, Ill.

[21] Appl. No.: 361,400

[22] Filed: Dec. 22, 1994

[51] Int. Cl.$^6$ ........................................... H04Q 7/38

[52] U.S. Cl. .................. 379/59; 379/37; 379/45; 379/60

[58] Field of Search .................. 379/37–40, 45, 379/58, 59, 60, 198, 201, 207; 346/506, 539, 988, 989, 993; 342/357, 387, 450, 457; 455/15, 17, 33.1, 54.1, 54.2, 56.1

[56] References Cited

U.S. PATENT DOCUMENTS

| | | |
|---|---|---|
| 4,757,267 | 7/1988 | Riskin ........................ 379/201 |
| 4,866,762 | 9/1989 | Pintar ........................ 379/188 |
| 4,901,340 | 2/1990 | Parker et al. ................ 379/60 |
| 5,388,147 | 2/1995 | Grimes ....................... 379/59 |
| 5,444,760 | 8/1995 | Russ .......................... 379/45 |

*Primary Examiner*—Dwayne D. Bost
*Attorney, Agent, or Firm*—Sherry J. Whitney; Walter W. Nielsen

[57] ABSTRACT

A method and apparatus for specialized call handling transmits (224) and receives (194) a specialized call request message, determines (196) a location of a remote communication unit (100, 110, 140) sending the specialized call request message, determines (200) at least one service center telephone number which the remote communication unit (100, 110, 140) may use to establish a specialized call, transmits (202, 206) a returned message to the remote communication unit (100, 110, 140) containing a selected service center telephone number, and sets up the specialized call (204, 232) using the selected service center telephone number.

17 Claims, 5 Drawing Sheets

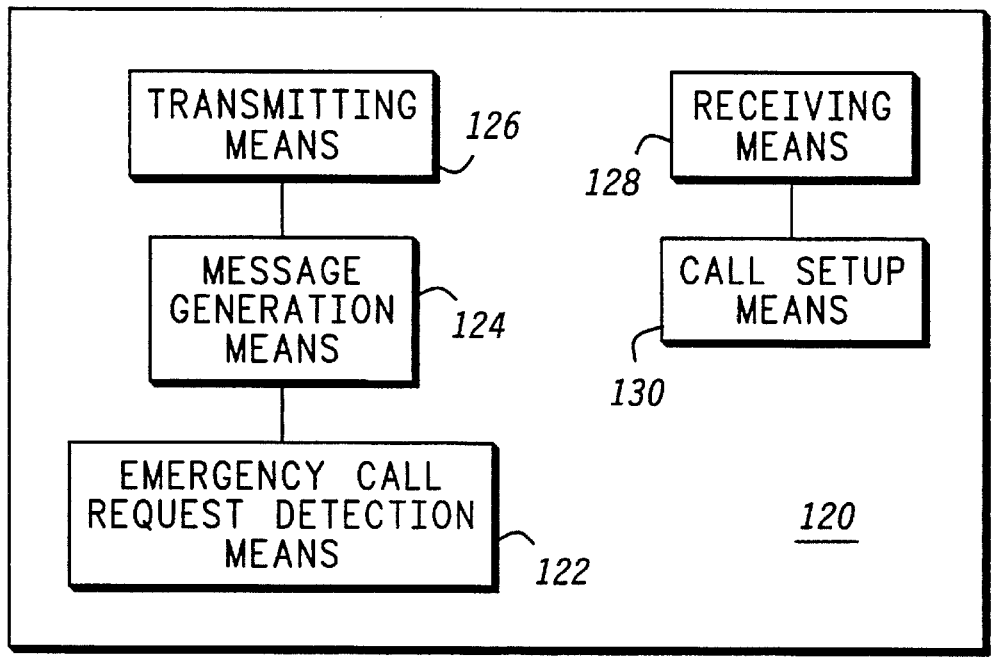
FIG. 3
FIG. 4
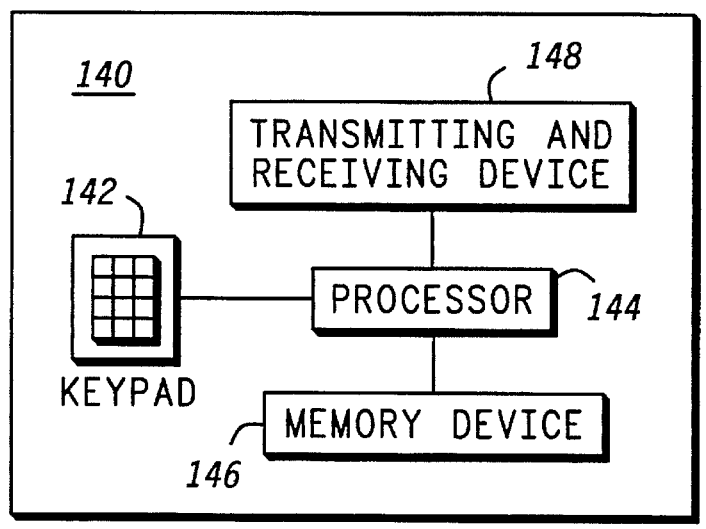

SPECIALIZED CALL ROUTING METHOD AND APPARATUS FOR A CELLULAR COMMUNICATION SYSTEM

FIELD OF THE INVENTION

The present invention relates generally to cellular communication systems and, more specifically, to cellular communication systems in which emergency communication services may be requested by users of the communication system.

BACKGROUND OF THE INVENTION

The need for requesting emergency services is a common one in communication systems. Commonly-known, standard emergency numbers are helpful to eliminate caller confusion during emergency situations. When a user dials the standard emergency number (e.g., 911 in the United States), the telephone switch receiving the emergency call makes a decision as to where to route that call. In prior art terrestrial telephone systems, the routing decision is based on the location of the fixed instrument from which the call is made. This location may be determined from the phone number of the fixed instrument. After a call is routed to an emergency service center which handles the call, an emergency service center operator may be presented with the street address at which the fixed instrument is located. One problem with this system is that a user in an unfamiliar country may not know the proper standard emergency telephone number for that country. Further, the user may not speak the language of the operator.

In prior-an cellular systems, a subscriber unit user makes an emergency call request to an operator responsible for the area serviced by the cellular switch (i.e., a "service provider"). The operator must ask the caller to provide his or her location, and the call is then transferred to the proper emergency service center based on the given location.

Besides the drawbacks to fixed-station emergency response systems, a further drawback to this system is that the caller must provide location information which the caller may not know. Thus, a cellular system user traveling in an unfamiliar city or country is likely to have difficulty obtaining emergency services.

In a global satellite cellular communication system, other problems may arise. First, many areas of the world have no emergency response systems or governments may not be willing to pay the costs of emergency calls. A global cellular system user may need to resort to emergency services supplied by the service provider. Finally, a single switch may serve multiple continents, rendering an approach in which a single emergency service center handles all emergency calls unworkable.

What is needed is a method and apparatus for determining emergency call routing in a terrestrially-based or a satellite-based cellular communication system. Further needed is an emergency call routing method and apparatus in which a cellular subscriber does not need to provide location information in an unfamiliar language. What is further needed is a method and apparatus for determining emergency call routing in which the subscriber may use the standard emergency number for the subscriber's own country no matter where the subscriber is located.

BRIEF DESCRIPTION OF THE DRAWINGS

FIG. 3 illustrates an apparatus for requesting an emergency call in accordance with a preferred embodiment of the present invention;

FIG. 4 illustrates a remote communication unit in accordance with a preferred embodiment of the present invention;

DETAILED DESCRIPTION OF THE DRAWINGS

The present invention provides a method and apparatus for emergency call routing in a terrestrially-based or satellite-based cellular communication system, wherein users (or "subscribers") may use a standard emergency number of their own country and are not required to provide location information. Basically, after a subscriber sends an emergency service request, an emergency service center is selected for routing the call. The selection is based on the location of the subscriber unit, the identity of the service provider with which the subscriber is enrolled, and any restrictions imposed by geopolitical or other entities.

The description refers to emergency call routing, however, the invention may apply to routing any type of "specialized" call where predefined telephone numbers are used as would be obvious to one of skill in the art based on the description. Therefore, "specialized call" may be substituted for "emergency call" in the description. Similarly, "specialized service request" may be substituted for "emergency service request", etc. Further, where the term "telephone number" is used, it is interchangeable with the term "communication number", indicating that a device receiving a service request need not be a telephone. Some other device may receive a service request, such as a computer or an answering machine, for example.

As used herein, a "subscriber unit" is a communication device used by a cellular communication system user. For example, a subscriber unit may be a hand-held portable cellular telephone, a pager, or a one-directional communication device. A subscriber unit may also be referred to herein as a "remote communication unit". An "emergency service center" (ESC) is defined as an entity which responds to emergency service requests. In a particular location, one or more ESCs may be available to respond to any particular emergency service request. An "ESC telephone number" is defined herein as an actual telephone number of an ESC. A "user-selected emergency number" is defined herein as the standard emergency number known to the user. A "gateway" is defined herein as an equipment facility capable of directly or indirectly communicating with a subscriber unit. For example, a gateway may be a cellular switch which directly or indirectly connects a subscriber unit to a terrestrial telephone network.

Figure 1:
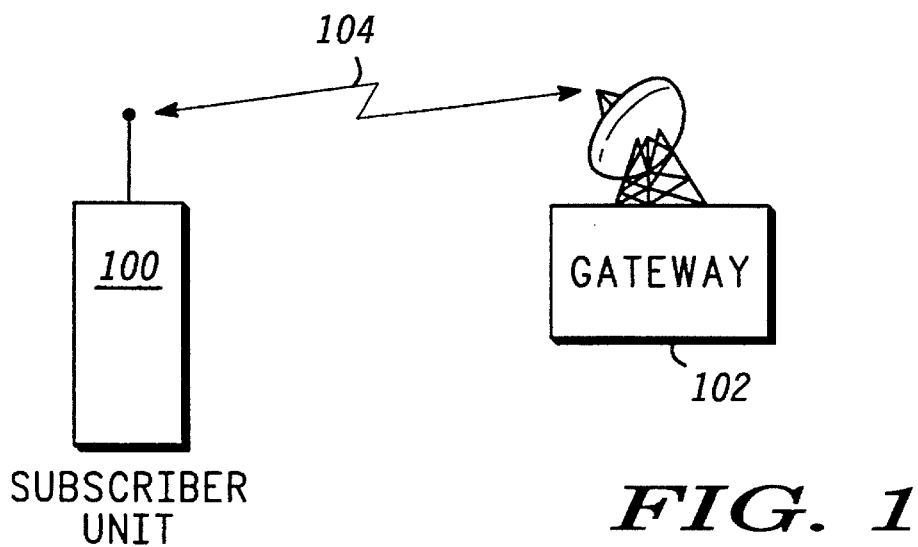
FIG. 1 illustrates a terrestrially-based cellular communication system which may incorporate the method and apparatus of the present invention.

FIG. 1 illustrates a terrestrially-based cellular communication system which may incorporate the method and apparatus of the present invention. Subscriber unit 100 communicates with gateway 102 over link 104. Link 104 represents a radio frequency (RF) communication path. In an alternate embodiment, link 104 may be an optical communication path. Gateway 102 is a cellular switch which links subscriber unit 100 to a terrestrial telephone network or to another communication network (e.g., to a satellite communication network). Gateway 102 may perform system control functions. Gateway 102 may also connect to another control center which performs system control functions.

Figure 2:
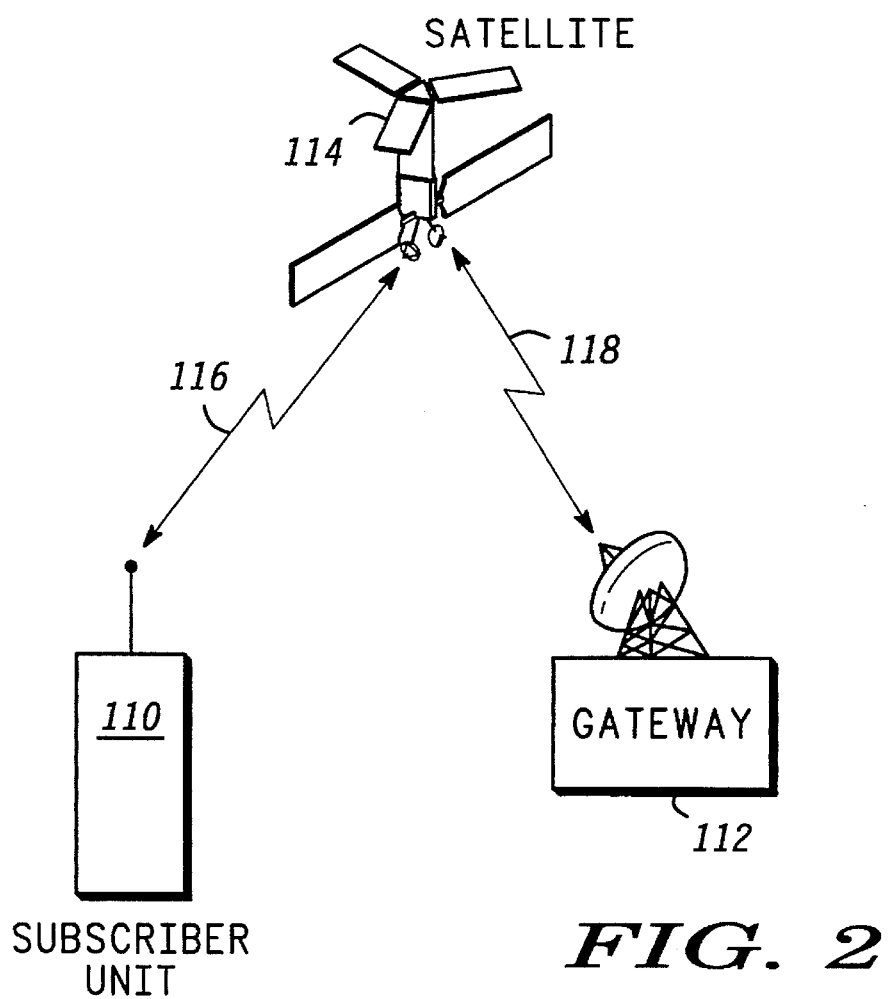
FIG. 2 illustrates a satellite-based cellular communication system which may incorporate the method and apparatus of the present invention.

FIG. 2 illustrates a satellite-based cellular communication system which may incorporate the method and apparatus of the present invention. Subscriber unit 110 communicates with gateway 112 through satellite 114 or a satellite network (not shown). Subscriber unit 110 communicates with satellite 114 over link 116. Satellite 114 communicates with gateway 112 or link 118.

A subscriber unit's "home gateway" is defined herein as a gateway containing information relevant to that particular subscriber unit. A "visited gateway" is a gateway other than a subscriber unit's home gateway. For example, a user living in the Chicago area may have a home gateway within that area. When the user travels to another area (e.g., a foreign country) the user must communicate with a visited gateway.

According to the method and apparatus of the present invention, a user's location may be roughly determined based on which cell the subscriber unit is located in at a particular time. Alternatively, a user's location may be determined based on geolocation information. As defined herein, a "location area code" (LAC) is a code number which identifies a particular location area (i.e., an area of a relatively small size having known boundaries). The present invention associates each LAC with an emergency service center if the country within which the LAC is located provides emergency services. A service provider may independently provide emergency services.

FIG. 3 illustrates an apparatus for requesting an emergency call in accordance with a preferred embodiment of the present invention. Apparatus 120 contains emergency call request detection means 122, message generation means 124, transmitting means 126, receiving means 128, and call setup means 130. Emergency call request detection means 122 accepts a request by a user for emergency service. For example, emergency call request detection means 122 may be a key pad capable of receiving a dialed number or a single button which, when pressed, indicates an emergency situation. Emergency call request detection means 122 is coupled to message generation means 124. Message generations means 124 creates an emergency service request message to be transmitted to a gateway. Message generation means 124 is coupled to transmitting means 126 which is used to transmit the emergency service request message.

Receiving means 128 is capable of receiving transmitted messages and is coupled to call setup means 130. Call setup means 130 evaluates access approved or denied messages transmitted to the apparatus to determine an ESC telephone number. Call setup means 130 then desirably begins to establish communication with that ESC. Transmitting means 126 and receiving means 128 may be, for example, one or more RF antennas. Alternatively, transmitting means 126 and receiving means 128 may be optical devices.

FIG. 4 illustrates a subscriber unit (or remote communication unit) in accordance with a preferred embodiment of the present invention. Subscriber unit 140 comprises keypad 142 processor 144 memory device 146, and transmitting and receiving device 148. Keypad 142 is an interface capable of receiving a request for emergency service from a user. Keypad 142 may be a conventional 10 digit keypad, or may be another indicator which, when pressed or set, indicates an emergency situation. Keypad 142 is coupled to processor 144. Processor 144 detects a request for emergency call and generates an emergency call request message. Processor 144 is coupled to memory device 146 which desirably contains information necessary for detecting an emergency call request and generating an emergency call request message. Processor 144 is coupled transmitting and receiving device 148 which is used to transmit the emergency call request message.

Figure 5:
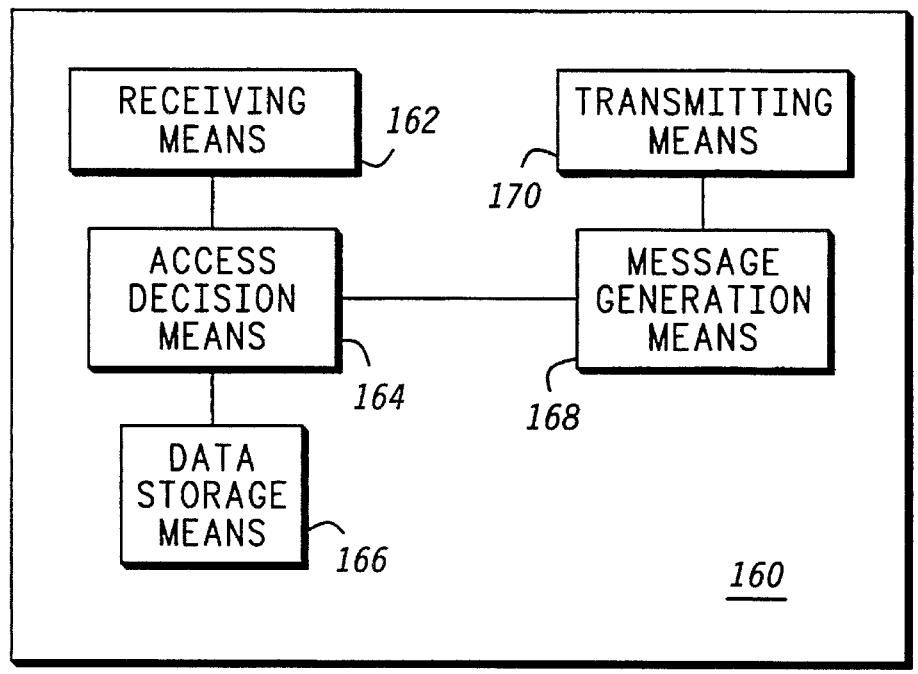
FIG. 5 illustrates an apparatus for handling an emergency service request in accordance with a preferred embodiment of the present invention.

FIG. 5 illustrates an apparatus for handling an emergency service request in accordance with a preferred embodiment of the present invention. Emergency service unit 160 comprises receiving means 162, access decision means 164, data storage means 166, message generation means 168, and transmitting means 170. Receiving means 162 is coupled to access decision means 164. When an emergency call request is received by receiving means 162, access decision means 164 determines which ESC, if any, is appropriate for the particular subscriber unit which transmitted the emergency service request. Access decision means 164 is coupled to data storage means 166. Data storage means 166 contains information which access decision means 164 uses in its determination of the appropriate ESC. Access decision means 164 is coupled to message generation means 168 which creates an access approved or an access denied message. Message generation means 168 is coupled to transmitting means 170 which is used to transmit the access approved or access denied message. Transmitting means 170 and receiving means 162 may be, for example, one or more RF antennas. Alternatively, transmitting means 170 and receiving means 162 may be optical devices.

Figure 6:
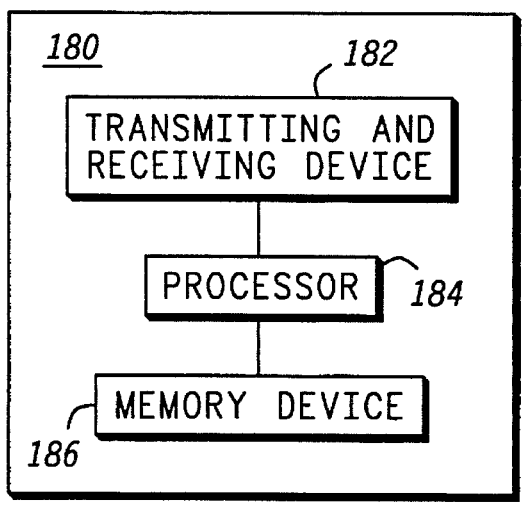
FIG. 6 illustrates a gateway in accordance with a preferred embodiment of the present invention.

FIG. 6 illustrates a gateway in accordance with a preferred embodiment of the present invention. Gateway 180 comprises a transmitting and receiving device 182 a processor 184 and a memory device 186. Transmitting and receiving device 182 is coupled to processor 184. When an emergency service request is received by transmitting and receiving device 182, processor 184 determines the appropriate ESC for the particular subscriber unit sending the emergency service request. Processor 184 then generates an access approved or an access denied message. Processor 184 is coupled to memory device 186 which contains information used in the access decision.

Figure 7:
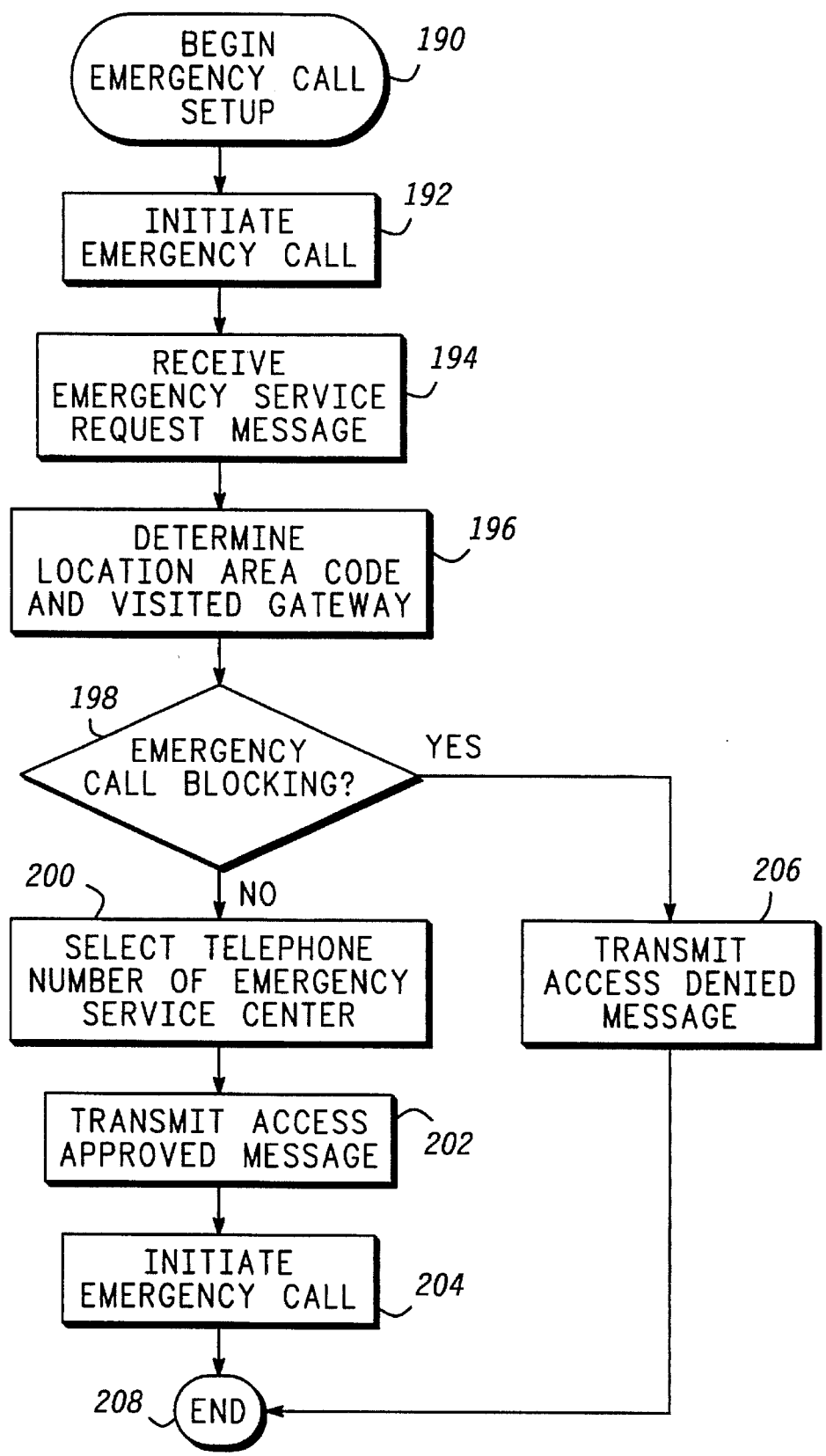
FIG. 7 shows a method for a communication system to establish an emergency call in accordance with a preferred embodiment to the present invention.

FIG. 7 shows a method for a communication system to establish (or "set up") an emergency call in accordance with a preferred embodiment to the present invention. The emergency call setup process begins in step 190 by performing the initiate emergency call step 192. In the initiate emergency call step 192, a user dials an emergency number or sets or presses an indicator which indicates to the subscriber unit that there is an emergency situation. In a preferred embodiment, a user-selected emergency number has been preprogrammed into the memory of this subscriber unit. When this user-selected emergency number has been dialed or an emergency request button has been pressed, the subscriber unit creates and transmits an emergency service request message.

A gateway receives the emergency service request message in step 194. In a preferred embodiment, the gateway is the user's home gateway. In alternate embodiments, the emergency service request message may be received by a visited gateway or by another control facility. Next, the determine location area code and visited gateway step 196 is performed. In step 196, the LAC of the subscriber unit is determined. For example, the LAC may be determined based on the cell in which the subscriber unit is located at the time of the emergency service request. Alternatively, the LAC may be determined by geolocation information. The visited gateway currently servicing the subscriber unit is determined based on the subscriber unit's location.

In the emergency call blocking step 198, the gateway determines whether the subscriber unit may receive emergency services. Emergency services may be blocked, for example, in a country which does not have the infrastructure necessary to provide emergency services. An emergency call may also be blocked in a country where emergency services are restricted.

If there is no emergency call blocking 198, the select telephone number of emergency service center step 200 is performed. In this step 200, the gateway desirably determines the ESC telephone number (or "service center telephone number") of an ESC associated with the particular LAC. This ESC is referred to herein as a "local entity" having a "local entity telephone number". The gateway may also determine an ESC telephone number (referred to herein as a "service provider telephone number") associated with the subscriber unit's service provider. The gateway will determine which of these two numbers will be used by the subscriber unit based on system constraints. For example, a particular country may require that the ESC telephone number associated with the service provider be used before using the ESC telephone number associated with the LAC is used, or visa versa.

In the transmit access approved message step 202, an access approved message is created containing the selected ESC telephone number. The access approved message is then transmitted to the subscriber unit. In an alternate embodiment, the ESC telephone number may be transmitted in a separate message following the access approved message. As used herein, the "access approved message" is one or more messages which convey that access is approved and which contains the ESC telephone number.

After the access approved message is received by the subscriber unit, the initiate emergency call through visited gateway step 204 uses the selected ESC telephone number to set up a call through the visited gateway. In some instances, the visited gateway will be the subscriber's home gateway. The emergency call setup procedure then exits in step 208.

If the emergency call blocking step 198 determines that an emergency call may not be made, the transmit access denied message step 206 creates a message indicating that access to emergency services is denied. The message is then transmitted to the subscriber unit and the procedure exits in step 208.

Figure 8:
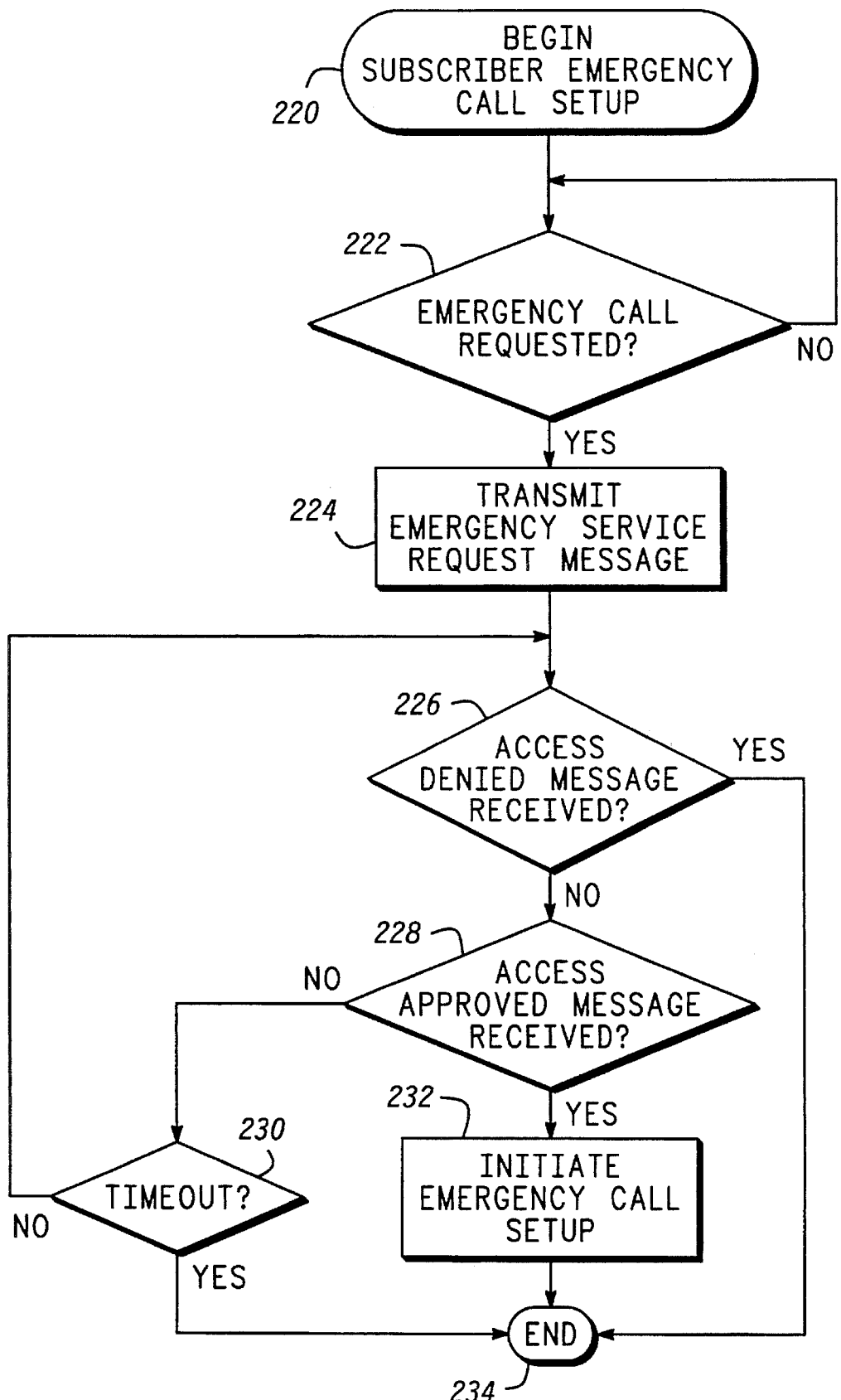
FIG. 8 illustrates a method for a subscriber unit to establish an emergency call in accordance with a preferred embodiment of the present invention.

FIG. 8 illustrates a method for a subscriber unit to establish an emergency call in accordance with a preferred embodiment of the present invention. The subscriber emergency call setup process 220 begins in step 222 by determining whether an emergency call has been requested by the user. For example, a user may request an emergency call by dialing the user-selected emergency number on the keypad or by pressing or setting an indicator on the subscriber unit. When no emergency call has been requested in step 222, the procedure iterates as shown in FIG. 8. In a preferred embodiment, determination of whether an emergency call has been requested is interrupt driven. If an emergency call has been requested in step 222, the transmit emergency service request message step 222 is performed. This step 224 creates an emergency service request message indicating an emergency situation and transmits the emergency service request message to a gateway.

Next, the access denied message received step 226 determines whether an access denied message has been received by the subscriber unit. If an access denied message has been received in step 226, the procedure exits in step 234. If no access denied message has been received in step 226, the access approved message received step 228 is performed.

This step 228 determines whether an access approved message has been received. If no access approved message is received in step 228, timeout step 230 determines whether a period of time (i.e., a "timeout value") allocated to waiting for an access approved or access denied message has been exceeded. If the timeout value has not been exceeded as determined in step 230, the procedure iterates as shown in FIG. 8. If the timeout value has been exceeded in step 230, the procedure exits in step 234. In a preferred embodiment, receipt of the access denied message or the access approved message, referred to generally as a "returned message", is interrupt driven.

If an access approved message has been received in step 228, the initiate emergency call setup step 232 is performed. In this step 232, the subscriber unit initiates call set up with the ESC associated with the ESC telephone number provided in the access approved message. In an alternate embodiment, step 232 may not be performed, and instead the ESC telephone number may be displayed by the subscriber unit. The procedure then exits in step 234.

In summary, a method and apparatus has been described for determining routing of emergency calls in a cellular communications system which overcomes specific problems and accomplishes certain advantages relative to prior-art methods and mechanisms. The improvements over known technology are significant. Cellular subscribers are able to request emergency services where the telephone number of a local ESC, the user's location, and the native language are unknown.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. In particular, while a preferred embodiment has been described in terms of requests for emergency service, the method and apparatus of the present invention may be utilized for any type of specialized call request.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for establishing a specialized call comprising the steps of:

a) receiving a specialized service request message from a remote communication unit, wherein the specialized service request message indicates that a user of the remote communication unit requires emergency services;

b) determining a location of the remote communication unit;

c) determining, based on the location, whether at least one service center exists which the remote communication unit may contact to obtain the emergency services; and d) transmitting an access approved message to the remote communication unit containing a service center communication number which enables the remote communication unit to contact the at least one service center if the at least one service center exists.

2. The method as claimed in claim 1 further comprising the steps of:

f) determining whether call services are blocked;

g) when the call services are blocked, not performing steps c)–f) and transmitting an access denied message to the remote communication unit; and h) when the call services are not blocked, performing steps c)–f).

3. The method as claimed in claim 1, wherein step b) comprises the step of evaluating a location area code contained within the specialized service request message which indicates the location of the remote communication unit.

4. The method as claimed in claim 1, wherein step c) comprises the steps of:

c1) determining a service provider associated with the remote communication unit;

c2) determining a service provider communication number based on the service provider;

c3) determining a local entity based on the location of the remote communication unit;

c4) determining a local entity communication number based on the local entity;

c5) making a determination of which of the local entity communication number and the service provider communication number should be used by the remote communication unit; and c6) choosing the selected service center communication number based on the determination.

5. The method as claimed in claim 1 further comprising the step of displaying the selected service center communication number by the remote communication unit.

6. The method as claimed in claim 1 further comprising the step of initiating a call setup procedure for the specialized call between the remote communication unit and the selected service center communication number.

7. The method as claimed in claim 6, wherein the initiating step comprises the step of initiating the call setup procedure through a visited gateway of the remote communication unit.

8. A method for performing a specialized call setup procedure comprising the steps of:

a) determining by a remote communication unit whether a specialized call has been requested, wherein a request for the specialized call indicates that a user of the remote communication unit requires emergency services;

b) when the specialized call has been requested, transmitting a specialized service request message to a gateway, wherein the specialized service request message indicates that the user requires the emergency services;

c) waiting for receipt of a returned message from the gateway, wherein, when the remote communication unit is in a location where the emergency services are unavailable, the returned message is an access denied message and, when the remote communication unit is in the location where the emergency services are available, the returned message is an access approved message;

d) when the returned message is the access denied message, ceasing the specialized call setup procedure; and e) when the returned message is the access approved message, initiating the specialized call using a service center communication number contained within the access approved message, wherein the service center communication number is a number which enables the remote communication unit to contact an entity which can provide the emergency services at the location of the remote communication unit.

9. The method as claimed in claim 8, wherein step a) comprises the step of determining whether a user-defined specialized call number has been dialed.

10. The method as claimed in claim 8, wherein step a) comprises the step of determining whether a particular indicator has been set.

11. The method as claimed in claim 8; wherein step c) comprises the steps of:

c1) determining whether a timeout value has been reached;

c2) when the timeout value has been reached, ceasing the specialized call setup procedure; and c3) when the timeout value has not been reached, continuing to wait.

12. A remote communication unit comprising:

means for determining whether a specialized call has been requested, wherein the specialized call indicates that a user of the remote communication unit requires emergency services;

means for generating a specialized call request message coupled to the means for determining, which generates the specialized call request message when the specialized call has been requested by the user;

means for transmitting coupled to the means for generating, which transmits the specialized call request message to a gateway;

means for receiving an access approved message from the gateway, wherein the access approved message indicates that the gateway determined that the remote communication unit is in a location where the emergency services are available, and the access approved message comprises a service center communication number which enables the remote communication unit to contact an entity which can provide the emergency services at the location; and means for setting up the specialized call coupled to the means for receiving, wherein the means for setting up the specialized call initiates a call setup procedure, using the service center communication number, between the remote communication unit and the entity which can provide the emergency services at the location.

13. A remote communication unit comprising:

a processor for determining whether a specialized call has been requested, wherein a request for the specialized call indicates that a user of the remote communication unit requires emergency services and, when the specialized call has been requested, for transmitting a specialized service request message to a gateway, wherein the specialized service request message indicates that the user requires the emergency services, for monitoring for receipt of a returned message from the gateway, wherein, when the remote communication unit is in a location where the emergency services are unavailable, the returned message is an access denied message and, when the remote communication unit is in the location where the emergency services are available, the returned message is an access approved message, for ceasing a specialized call setup procedure when the returned message is the access denied message, and, when the returned message is the access approved message, for initiating a setup of the specialized call using a service center communication number contained within the access approved message, wherein the service center communication number is a number which enables the remote communication unit to contact an entity which can provide the emergency services at the location of the remote communication unit; and a transmitting and receiving device coupled to the processor for transmitting the specialized service request message and for receiving the returned message.

14. The remote communication unit as claimed in claim 13 further comprising a keypad coupled to the processor for inputting a specialized call request.

15. The remote communication unit as claimed in claim 13 further comprising an indicator coupled to the processor for inputting a specialized call request.

16. A specialized call handling apparatus comprising:

means for receiving a specialized call request message from a remote communication unit, wherein the specialized call request message indicates that a user of the remote communication unit requires emergency services;

means for determining whether an access to specialized services will be granted coupled to the means for receiving, wherein the means for determining determines whether the access will be granted based on a location of the remote communication unit which sent the specialized call request message, wherein when the location of the remote communication unit falls within an area where the emergency services are unavailable, then the access to the specialized services is denied, and when the location of the remote communication unit falls within an area where the emergency services are available, then the access to the specialized services is approved;

means for storing data coupled to the means for determining, wherein the data is used to determine whether the access will be granted;

means for generating a returned message coupled to the means for determining, which generates an access approved message when the means for determining determines that the access to the specialized services is approved, and an access denied message when the means for determining determines that the access to the specialized services is denied; and means for transmitting the returned message to the remote communication unit, wherein the means for transmitting is coupled to the means for generating.

17. A specialized call handling apparatus comprising:

a processor for receiving a specialized call request message from a remote communication unit, wherein the specialized call request message indicates that a user of the remote communication unit requires emergency services, for determining a location of the remote communication unit which sent the specialized call request message, for determining, based on the location, whether at least one service center exists which the remote communication unit may contact to obtain the emergency services, and for transmitting a returned message to the remote communication unit containing a service center communication number which enables the remote communication unit to contact the at least one service center if the at least one service center exists;

a memory device coupled to the processor for storing information necessary to determine the at least one service center communication number; and a transmitting and receiving device coupled to the processor for transmitting the returned message and for receiving the specialized call request message.

* * * * *